Sept. 23, 1924.   1,509,176

C. J. QUICK

LEAF SPRING

Filed Oct. 18, 1921

Inventor
C. J. Quick
By Howard P. Denison
Attorney

Patented Sept. 23, 1924.

1,509,176

UNITED STATES PATENT OFFICE.

CLAUDE J. QUICK, OF PULASKI, NEW YORK.

LEAF SPRING.

Application filed October 18, 1921. Serial No. 508,575.

*To all whom it may concern:*

Be it known that I, CLAUDE J. QUICK, of Pulaski, in the county of Oswego, in the State of New York, have invented new and useful Improvements in Leaf Springs, of which the following, taken in connection with the accompanying drawings, is a full, clear, and exact description.

This invention relates to leaf springs for automobiles and analogous uses involving the use of rollers between the leaves and in staggered relation to hold the leaves in spaced relation and thereby avoid friction one with the other when in action.

I am aware that rollers and balls in recesses or openings in one or the other of the contiguous faces of the leaves for holding the leaves in spaced relation and anti-friction between them have heretofore been proposed but it is found that when the recesses or openings are made in the body of the leaves intermediate the longitudinal edges thereof or extending from edge to edge, it tends to weaken the spring at those points aside from rendering those parts more or less cumbersome by deformation, and the main object of my present invention is to avoid these objectionable structural features and incidental weaknesses by leaving the adjacent faces of the main bodies of the leaves particularly at their points of contact with the rollers substantially flat transversely and longitudinally so that the antifriction spacing rollers may contact with the adjacent faces of the leaves along straight lines nearly the full width of said leaves, whereby practically all portions of the contiguous faces including those engaged by the rollers will be in uniformly spaced relation.

In the use of these antifriction spacing rollers, it is necessary to provide some means for holding them in approximately parallel relation against endwise or radial displacement transversely or lengthwise of the leaves, and for this purpose, the extreme ends of the rollers are enlarged or headed to work relatively shallow recesses in the corresponding edges of the adjacent leaves.

In other words, the second object of the invention is to provide means whereby the rollers may be retained in place without weakening or materially disfiguring the leaves of the spring or adding extra material thereto for that purpose.

Other objects and uses relating to specific parts of the spring will be brought out in the following description:

In order that my invention may be understood, I have shown a series of spring leaves —1— gradually diminishing in length from bottom to top and held in spaced relation by interposed rollers —2—, the length of each roller being substantially equal to the transverse width of the leaves, which are preferably all of the same width.

Figure 1:
Fig. 1 is a side elevation of the semi-elliptic spring embodying the various features of my invention.
Figure 2:
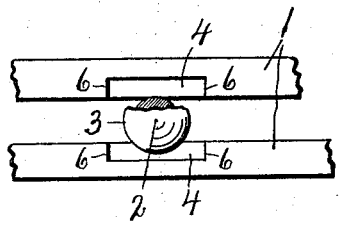
Fig. 2 is an enlarged side elevation of portions of two of the adjacent springs and one of the interposed rollers.
Figure 3:
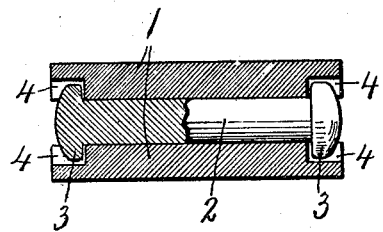
Fig. 3 is an enlarged transverse sectional view taken on line 3—3, Figure 1 except that a portion of the rollers is shown in elevation.

The opposite ends of each roller are enlarged to form their heads —3— Fig. 3, while the portion between the heads is cylindrical and of uniform diameter and determine the spacing of the leaves one from the other.

The rollers between the several leaves are preferably arranged in staggered relation lengthwise of the leaves to distribute the resiliency of said springs more uniformly throughout their lengths. The opposite edges of the contiguous faces of the leaves are at the points where the rollers —2— are located and are provided with notches or relatively shallow recesses —4— for receiving the annular flanges or heads on the ends of the rollers —2—.

That is, the transverse depth of the notches or recesses —4— is substantially equal to the axial length of the heads —3— and, therefore, the transverse distance between the inner walls of companion recesses —4— of each leaf is substantially equal to the distance between the end head —3— on the rollers to cooperate with said heads in holding the rollers against axial displacement and also keeping the adjacent leaves in alinement one with the other.

The axial length of the rollers —2— to the extreme outer ends of the heads —3— is, therefore, substantially equal to or slightly less than the transverse width of the leaves of the spring so that the edges of the springs aside from the clips as —5— are free from obstructions throughout their lengths and present a neat and smooth exterior appearance.

The radial depth of the recesses —4— relatively to the rollers —2— are slightly less than the radial depth of the heads —3— beyond the cylindrical main bodies of the rollers to allow the flat intervening portions of the contiguous faces of the leaves to rest upon the periphery of the cylindrical portions of the rollers throughout the entire distance between the heads —3— without contact of the outer walls of the recesses —4— with the periphery of said heads.

The length of the recesses —4— is equal to or slightly greater than the diameter of the heads —3— to permit relative endwise movement of the adjacent leaves and at the same time to prevent undue displacement of the rollers lengthwise of the leaves by contact of the peripheries of the heads —3— with the end walls as —6— of the recesses in case the rollers should become displaced from a position midway between said end walls —6— at which they are initially set.

It is now clear that the leaves engage the opposite faces of the periphery of the rollers —2— along straight parallel lines a distance nearly equal to the width of the leaves, which may, therefore, be made of uniform thickness without special deformation or weakening except as to relatively small recesses —4— in the opposite longitudinal edges thereof to receive the heads —3—, and that these heads cooperate with the inner walls of the recesses to hold the rollers and leaves against relatively endwise or lateral displacement, the end walls of the recesses serving also to limit the movement of the rollers lengthwise of the leaves.

What I claim is:

A bow spring comprising a plurality of spring leaves arranged in spaced relation one above the other, rollers in longitudinally spaced relation between said leaves for holding them in spaced relation and permitting their relative endwise movement, said rollers having both ends provided with annular flanges projecting into recesses in adjacent portions of the springs, the springs having portions thereof extended entirely across the recesses and peripheries of the adjacent flanges of the rollers to protect them against contact with external objects and also to avoid excessive weakening of the leaves.

In witness whereof I have hereunto set my hand this 14th day of October, 1921.

CLAUDE J. QUICK.

Witnesses:
JOHN E. ABBOTT,
BYRON SMITH.